(12) United States Patent
Beckmann et al.

(10) Patent No.: US 7,751,441 B2
(45) Date of Patent: Jul. 6, 2010

(54) METHOD FOR EXCHANGING DATA PACKETS BETWEEN TWO SERVICE PROVIDERS OF A RADIOTELEPHONY TRANSMISSION SYSTEM

(75) Inventors: Mark Beckmann, Braunschweig (DE); Michael Eckert, Braunschweig (DE); Martin Hans, Hildesheim (DE); Andreas Otte, Celle (DE)

(73) Assignee: Siemens Aktiengesellschaft, Munich (DE)

( * ) Notice: Subject to any disclaimer, the term of this patent is extended or adjusted under 35 U.S.C. 154(b) by 1308 days.

(21) Appl. No.: 10/415,866

(22) PCT Filed: Oct. 31, 2001

(86) PCT No.: PCT/DE01/04122

§ 371 (c)(1), (2), (4) Date: Oct. 16, 2003

(87) PCT Pub. No.: WO02/37789

PCT Pub. Date: May 10, 2002

(65) Prior Publication Data

US 2004/0057423 A1    Mar. 25, 2004

(30) Foreign Application Priority Data

Nov. 3, 2000    (DE) ............................... 100 54 473

(51) Int. Cl.
*H04L 29/06*    (2006.01)
(52) U.S. Cl. ...................... 370/474; 370/469
(58) Field of Classification Search ............ 370/390, 370/329, 349, 469, 465, 394, 346, 235, 468, 370/331; 375/296; 455/67, 436; 714/48, 714/748; 709/230
See application file for complete search history.

(56) References Cited

U.S. PATENT DOCUMENTS 6,091,709 A * 7/2000 Harrison et al. ............. 370/235
6,301,249 B1 * 10/2001 Mansfield et al. ........... 370/394
6,301,479 B1 * 10/2001 Roobol et al. ............... 455/436

(Continued)

FOREIGN PATENT DOCUMENTS

WO    WO 00/21253    4/2000

OTHER PUBLICATIONS

XP-002204734—$3^{rd}$ Generation Partnership Project: "ARIB STD-T63-25.301 V3.3.0 Radio Interface Protocol Architecture" pp. 1-48 Dec. 1999.

*Primary Examiner*—Hanh Nguyen
*Assistant Examiner*—Syed Bokhari
(74) *Attorney, Agent, or Firm*—King & Spalding, L.L.P.

(57) ABSTRACT

In a third generation (UMTS) mobile radiotelephone system, data are transmitted between a base station and a mobile station in packet form via the air interface. A connection control protocol with the task of, inter alia, establishing whether and which of the data packets have been lost during the transmission, using control data, functions in both stations. These control data are added to each packet that is sent by the connection control protocol. Several packets can be transmitted within the transmission interval and the number of packets can vary from interval to interval. This allows different data transmission rates. The inventive method enables the number of packets that are sent via the air interface to be reduced, by transmitting larger, rather than more, packets within a predetermined interval, while not affecting the possibility of varying the data transmission rate.

10 Claims, 5 Drawing Sheets

U.S. PATENT DOCUMENTS 6,643,813 B1 * 11/2003 Johansson et al. ........... 714/748
6,671,287 B1 * 12/2003 Huttunen et al. ............ 370/469
6,697,604 B1 * 2/2004 Rimpela et al. .......... 455/67.14
6,714,597 B1 * 3/2004 Antonio et al. ............. 375/296
6,772,215 B1 * 8/2004 Rathonyi et al. ............ 709/230
7,269,184 B2 * 9/2007 Kobayashi .................. 370/468

* cited by examiner

METHOD FOR EXCHANGING DATA PACKETS BETWEEN TWO SERVICE PROVIDERS OF A RADIOTELEPHONY TRANSMISSION SYSTEM

BACKGROUND OF THE INVENTION

In a third generation mobile radiotelephone system, data are transmitted from a base station to a mobile radiotelephone station in packet form via the air interface or are transmitted in the opposite direction.

A connection control protocol is situated in the base station and the mobile radiotelephone station, whereby one purpose of the connection control protocol is to determine, on the basis of control data, whether and which data packets have been lost during the transmission. These control data must be added to each packet sent by the connection control protocol. A number of packets can be transmitted within what is referred to as a transmission interval. The number of packets to be transmitted can vary from interval to interval. This allows different data transmission rates. The present invention proposes a method which makes is possible to reduce the number of packets that are transmitted via the air interface, by transmitting larger, rather than more, packets within a transmission interval. This does not affect the possibility of varying the data transmission rates.

In the third generation (UMTS) mobile radiotelephone system (Universal Mobile Telecommunication System), the mobile radiotelephone stations, named in UMTS UE (User Equipment), are connected via an air interface to a base station, named in UMTS Node B. The node B, in turn, is connected via a first fixed network connection to a radio network controller RNC which, in turn, is connected to a network unit GSN (GPRS Support Node) via a second fixed network connection (FIG. 1).

FIG. 2 shows the structure of the UE, the node B and the RNC, whereby only the layers 1 and 2, which are referred to as physical layer and link layer (here composed of MAC and RLC) in the OSI model, can be seen. If the data to be sent are control data, the radio resource control RRC (not shown in FIG. 2) is situated above the layer referred to as RLC. In packet form, user data to be transmitted are either directly given to the RLC layer from higher layers or from the packet data convergence protocol layer which is not shown in FIG. 2 and which is not relevant for the present invention. The respective layer processes the data in the transmitter and forwards the data to the next layer therebelow. The RLC layer forwards the packets to the medium access control MAC which, in turn, processes the packets and subsequently forwards them to the layer 1. Within a layer, the packets that have been received by a higher layer are referred to as SDUs (Service Data Units) and the packets that are forwarded to layers that are situated below it are referred to as PDUs (Packet Data Unit).

Layer 1 transmits the data via the air interface to the base station node B in which the layer 1 is also contained. Layer 1 transmits the received packets via the fixed network connection to the MAC in the RNC which, after the packets have been processed, forwards the packets to the RLC which finally forwards the packets to the higher layers.

FIG. 3 shows the connection layer RLC and the medium access control MAC. As it has already been mentioned, further layers that are not relevant for the present invention are situated above the RLC. These higher layers transmit their packets, via what are referred to as radio bearers, to the RLC. The RLC is composed of a number of units which can run in different modes, whereby a number of units can run in the same mode. In the transparent mode (TR mode), control data are not added to the packets that have been received from higher layers. Therefore, this mode is not relevant for the present invention.

In what is referred to as an unacknowledged mode (UN mode), the packets (SDUs) received from higher layers are segmented and combined into larger packets. A sequence number is added to the packets (PDUs) that are subsequently forwarded to the MAC. On the basis of the sequence number, it can be determined on the receiver side whether one or more packets have not been received between the reception of two PDUs. The size of the PDUs, in which the SDUs are segmented or, respectively, combined, varies and is not prescribed by the MAC layer. The application of the present invention with respect to this mode is conceivable in order to facilitate the realization in the software since the packets could be presegmented and cannot be segmented at the moment anymore when the size of the PDU is prescribed by MAC.

In what is referred to as an acknowledged mode (AM mode), the SDUs are segmented or, respectively, combined into packets of equal size, named payload units (PUs). In order to make it possible for the received RLC unit to correctly assemble the original SDUs which are forwarded from higher layers to the RLC unit, the PUs have indicators which inform the received RLC unit as to where an SDU ends within a segment. These indicators are referred to as length indicators. According to the current prior art, a bit of information (D/C) indicating whether a data packet or a control packet is concerned, a sequence number, what is referred to as control data extension information (HE) indicating whether the next octet contains an aforementioned length indicator or already contains user data, and what is referred to as an polling bit that can be used for the reception acknowledgement mechanism, is additionally added to each segment. The D/C and the P field are not relevant for the present invention. FIGS. 4a and 4b show the two PDUs according to the current prior art. In PDU 4b, an SDU ends in the PU, so that the third octet of the PDU is a length indicator.

The RLC is informed by MAC about the number of the PDUs to be transmitted via air in the next transmission interval. The size of the PDUs is static. As a result, RLC can determine the PU size on the basis of the size of the PDU since the size of the PDU precisely corresponds to the PU size+2 bytes. If an SDU ends within a PDU or, respectively, PU and if the remaining space of this PDU or, respectively, PU is filled with padding, a further length indicator, whose fixed value indicates that the PU has been filled with padding, is added to the PDU or, respectively, PU. FIG. 4b shows a PU in which an SDU ends, the remainder of the PDU, however, is filled with a first segment of a second SDU. The first bit from the right is an extension bit (E) indicating whether the LI is followed by a further LI or user data. Therefore, only one LI is necessary. FIG. 4c shows a PDU in whose PU an SDU ends and the remainder of the PU must be filled with padding. Two LIs are necessary as a result. One LI that indicates that an SDU ends within the PU and a second one that indicates that the PU has been filled with padding.

The PDUs are forwarded to the MAC via logical connections and are subsequently transmitted via the air interface. On the receiver side, the MAC forwards the packets to the RLC via the logical connections. As the name already indicates, the reception of a packet is acknowledged in the acknowledged mode by the receiving RLC unit. For this purpose, a number of mechanisms are known. For example, an RLC unit can send an acknowledgement for all packets received since the last acknowledgement has been sent after a timer has expired. Or, the transmitting RLC unit, in a packet via an additional bit of information (polling bit), can request from the receiving RLC unit to return an acknowledgment.

Packets that have not been acknowledged by the receiving side are transmitted again by the transmitting RLC unit. For this purpose, all transmitted PDUs must be stored in the RLC unit until a positive reception acknowledgement is received. Since the packet size of all stored packets is equal and since the MAC always requests a number of packets of this size, the packets that have to be sent again can be forwarded to the MAC at any time without problems. As a result, it can occur that a PDU having the sequence number 5 is sent after a PDU having the sequence number 10 and the PDU having the sequence number 11 follows thereafter.

The smallest possible transmission rate for a logical channel is determined via the PU size. This transmission rate can be higher depending on the number of the PDUs indicated by MAC.

SUMMARY OF THE INVENTION

For the 99 version of the RLC, it has already been discussed to transport a number of PUs in a PDU. ANNEX A describes the concept as has been proposed for the 99 version and as it was contained in the specification of the RLC TS 25.322 v3.0.0. This has the advantage that it is still possible to vary the data transmission rates in that the number of PUs is determined per PDU, and the control data (sequence number, D/C field, HE field and P field) have to be transmitted only once for the one, larger PDU via the air interface. Then, the sequence number should only indicate the sequence number of the first PU. The sequence numbers of the following PUs can be calculated therefrom.

The concept for the 99 version proposed to have all LIs of the PUs, which were contained in a PDU, follow the sequence number in the order of the PUs. When PUs, which did not require a LI, and PUs, which did require an LI, were transported together in a PDU, the problem of allocating LIs to the PUs resulted; this problem has not yet been solved.

The same was valid for PUs which were not in the correct order relative to the other PUs of a PDU. A control data extension was suggested in which the sequence number of the PU should follow outside of the order of the first sequence number. In this case, it was also not possible to allocate the second sequence number to the PU, so that the solution was to add sequence numbers for all contained PUs. The disadvantage was that it was no longer possible to reduce the control data.

Furthermore, the space taken by the control data extensions had to be subtracted from the size of the PU. Therefore, it was not possible, without further ado, to transmit once again the already transmitted PUs since they possibly did not require a control data extension given the repeated transmission. Therefore, the size of the PU was no longer equal to the size of the PU that was transmitted for the first time.

The basic condition for the present invention was that SDUs received from higher layers were to be presegmented in PUs and these PUs were to be stored in the transmitting RLC unit and no longer varied until the reception acknowledgement by the receiving RLC unit even when they had to be transmitted again. The length indicators indicating the end of a SDU within a PU are purposefully part of the PU since they do not change either.

Furthermore, the present invention differentiates between two different types of padding, the padding within a PU, referred to as PU padding in the following, and the padding within a PDU, referred to as PDU padding in the following.

PDU padding refers to the padding within a PDU and is necessary, for example, since the PDU holds a number n of PUs and the corresponding control data (D/C, HE, P field and sequence number), and space that is smaller than a PU size is still remaining in the PDU, so that PDU padding must be added. Whether a PDU contains such a PDU padding can be determined with the aid of the knowledge of the PDU size and the size of the control data. As a result, additional signaling is not necessary.

PU padding refers to the padding within a PU and is necessary, for example, since anSDU ends in a PU and does not completely fill the SDU and since a segment of a further SDU is not inserted. In order to indicate that the PU contains padding, the special length indicator, which indicates in the currently valid version that the PDU contains padding, is added to the PU. Therefore, it indicates that the remainder of the PU is padding and not the remainder of the PDU.

The essence of the present invention is a length indicator bitmap (LI bitmap) contained in a PDU when more than one PU is contained in the PDU. The LI bitmap can be 8 or 16 bits long. The number of the PUs per PDU is limited to 8 or, respectively, 16 when an 8 bit long or, respectively, 16 bit long LI bitmap is selected. An LI bitmap as shown in FIG. 5 would be particularly advantageous in that the last bit, an extension bit (E-bit; extension bit), indicates whether a further LI bitmap follows in the next octet.

Therefore, the LI bitmaps vary with respect to the number of the PUs to be transported. Every bit of the LI bitmap indicates whether a PU allocated to the bit starts with an LI or with user data.

Another important part of the present invention is the following definition: If PUs that have to be repeatedly transmitted and PUs that are transmitted for the first time are to be transmitted in a PDU, it is defined where the PUs to be repeatedly transmitted and where the PUs to be transmitted for the first time are contained in the PDU. For example, one possibility would be that the PUs that have to be repeatedly transmitted must be inserted first into the PDU.

As has been proposed earlier for the 99 version, for a 16 bit long additional field, a control data extension is additionally inserted for each of the PUs that have to be repeatedly transmitted. It contains a sequence number, extension information, (e.g., one bit), which indicates whether another control data extension follows and contains a field that can be used for purposes that have not yet been specified.

Furthermore, the present invention includes a regulation that defines which sequence numbers are allocated to which PUs. For example, a possible regulation would be to always transport the sequence numbers, which are allocated to the PUs to be repeatedly transmitted, in the control data extension and to transport the sequence number of the first PU, which is to be transmitted in the correct order, in the first sequence number field.

The following combination of entering the sequence number and placing the PUs would be particularly advantageous: The sequence number entered in the first sequence number field is the one designating the next PU to be transmitted for the first time. The sequence numbers of the PUs to be repeatedly transmitted are transported in the control data extensions. The first PU to be transmitted for the first time is inserted into the PDU after the PUs to be repeatedly transmitted. This PU in the PDU is followed by further PUs that are to be transmitted for the first time. A sequence number must not be inserted for them since the sequence number of these PUs is always increased only by one. If an entire PDU is filled with PUs that are repeatedly transmitted and these PUs are in an order, the PDU is set up as if a PDU is concerned that is exclusively filled with PUs that have not yet been sent.

If PUs that must be repeatedly transmitted and PUs that are to be transmitted for the first time are present, it is inventively proposed that the number of PUs to be transmitted for the first time and the number of the PUs to be repeatedly transmitted are requested by the MAC at the RLC, so that the MAC can select an ideal combination of the number and size of the PDUs.

Furthermore, it is inventively proposed that the RLC generates PUs that only contain PU padding if the MAC demands a PDU from the RLC that is larger than the PUs available for the transmission and the space to be filled in the PDU is larger than a PU. A sequence number is not allocated to such a PU generated by the RLC and the PU is ignored or, respectively, deleted on the receiver side.

Additional features and advantages of the present invention are described in, and will be apparent from, the following Detailed Description of the Invention and the Figures.

DETAILED DESCRIPTION OF THE INVENTION

Figure 1:
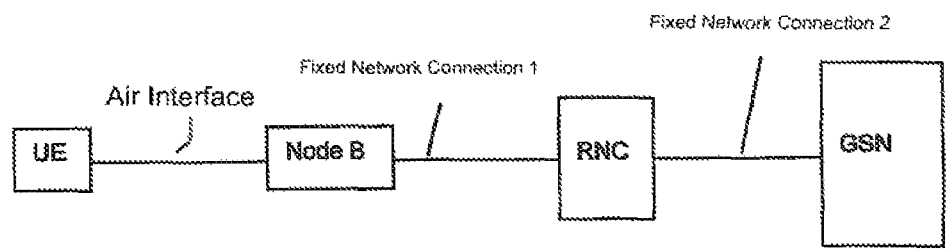
FIG. 1 shows a block diagram schematic of a third generation (UMTS) mobile radio telephone system.
Figure 2:
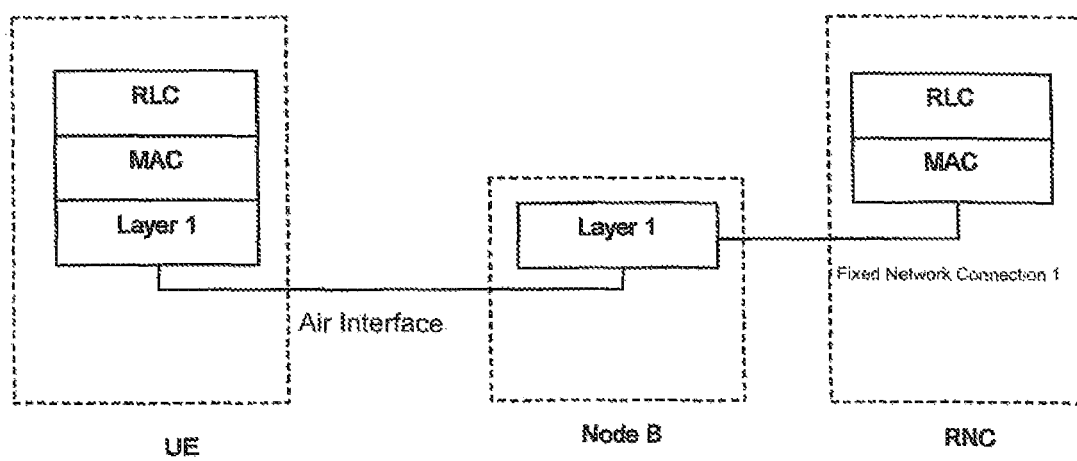
FIG. 2 shows a block diagram of the physical and link layers of the user equipment, base station and radio network controller of the mobile radio telephone system from FIG. 1.
Figure 3:
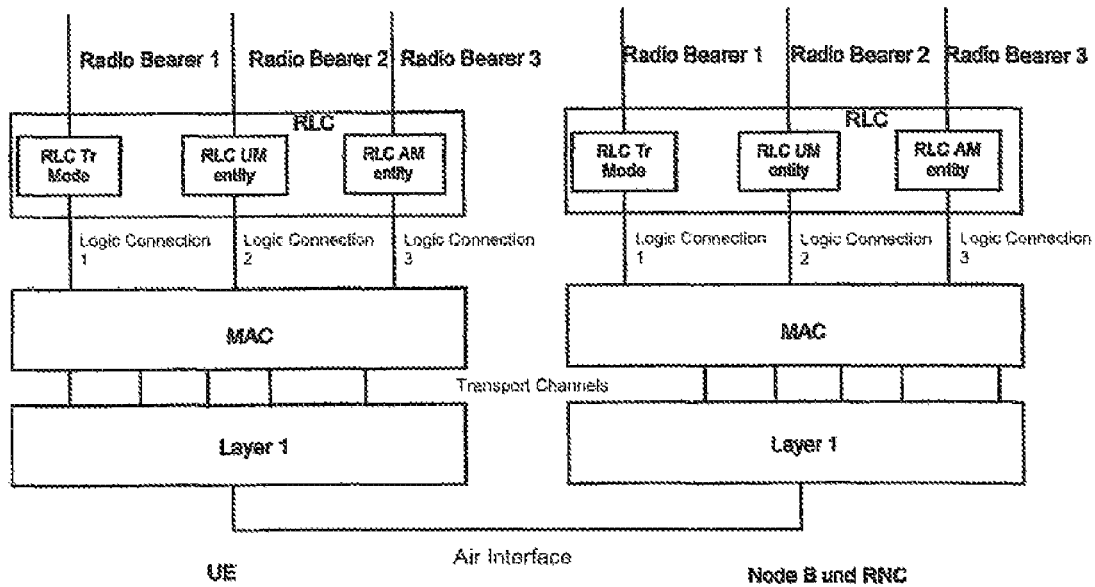
FIG. 3 shows details of the connection layer and medium access control of the components from FIG. 2.

The exemplary embodiments are based on a connection as shown in FIG. 2. It is assumed that the AM RLC unit has received a packet of the size of 100 bytes from the appertaining radio bearer 3. Given the setup of the radio bearer 3, it has been determined for the corresponding AM RLC unit of the transmitter and of the receiver that the PUs should have a size of 30 bytes. The transmitter and receiver can be either RNC or UE. For this purpose, the RRC, which are situated above the RLC layers, exchange bits of information on the basis of which the respective RRC layer configures the other layers below it. In contrast to the prior art, the PU size is not calculated from the PDU size, which is prescribed by MAC, but is determined by the RRC layer.

Figure 7:
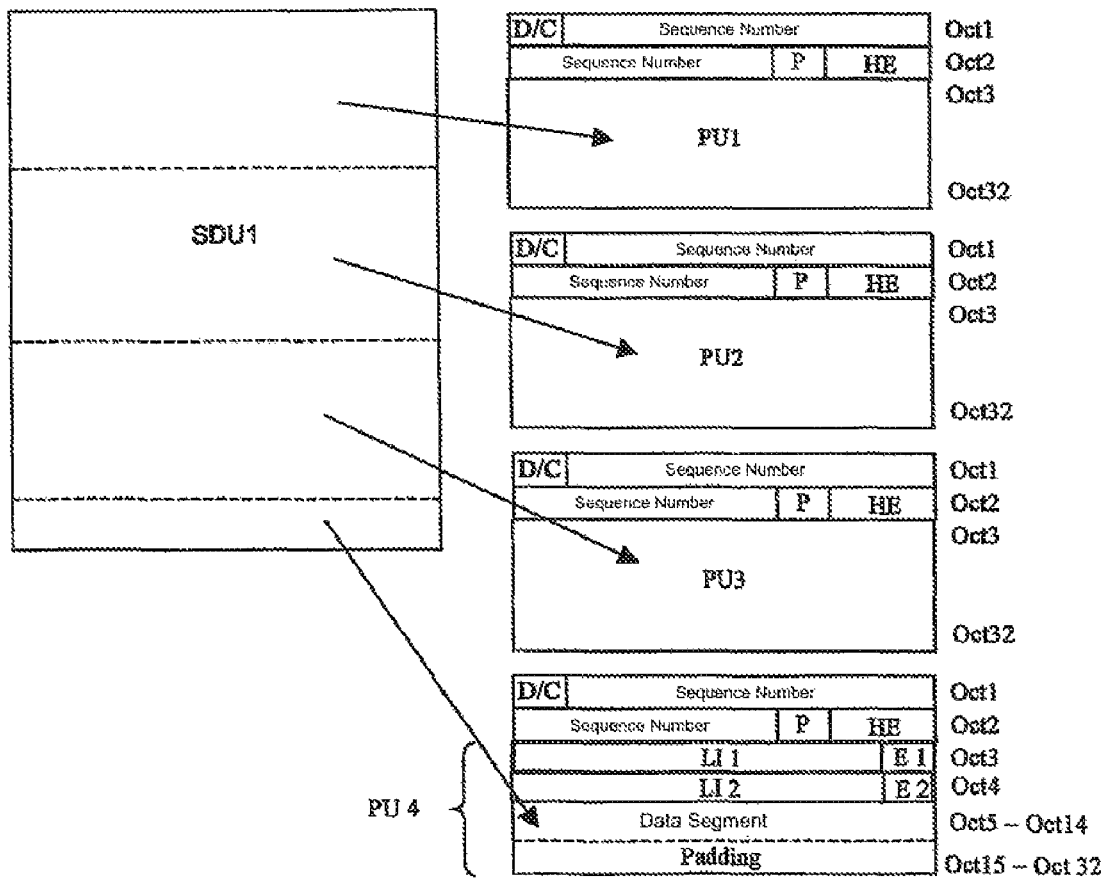
FIG. 7 shows an exemplary embodiment of the present invention wherein a service data unit has been segmented into four payload units.

The SDU1 now is segmented into four PUs, PU1 to PU4. The four PUs receive the sequence numbers 10 to 13. The first three PUs are completely filled with data. The fourth PU only contains 10 bytes of the SDU1. It is exemplarily assumed that the AM RLC unit has no further data to be transmitted, so that the fourth PU must begin with two length indicators (LI) (see FIGS. 7 and 8). The first LI indicates that the SDU1 ends after 10 bytes after the LI fields, the following extension bit E1 indicates that another LI field follows. In this example, a bit set to one indicates that a further LI follows. The second LI indicates that the remainder of the PU contains padding (PU padding) since no further data is contained therein. The following extension bit E2 is set to 0 since another LI field does not follow. Subsequently, the four PUs are stored in the AM RLC entity. For each logical channel, (the logical channels 1 to 3 in this example), the MAC now informs the RLC about the desired size regarding the RLC PDUs and about the desired number of PDUs of this size that the MAC wishes to receive from the corresponding RLC unit. On the basis of these parameters, the MAC adjusts the data rate for each logical channel at the time of the request with respect to the PDUs. Among other things, the selection of the number and size of the PDUs is based on the MAC requesting the number of the PUs or, respectively, the memory occupied by them, which are to be transmitted for the first time from the AM RLC unit, and also on requesting the number of the PUs or, respectively, memories occupied by them, which are to be repeatedly transmitted from the AM RLC unit.

Given the setup of the radio bearer, the MAC has also been informed about possible combinations of RLC sizes and the number which it can use for transmitting the data. It is assumed for all examples that the following combinations are available to the MAC:

Combination 1: 1 PDU; size 32 bytes

Combination 2: 2 PDUs; size 32 bytes

Combination 3: 3 PDUs; size 32 bytes

Combination 4: 4 PDUs; size 32 bytes

Combination 5: 1 PDU; size 123 bytes

Combination 6: 1 PDU; size 93 bytes

Combination 7: 1 PDU; size 63 bytes

Figure 4:
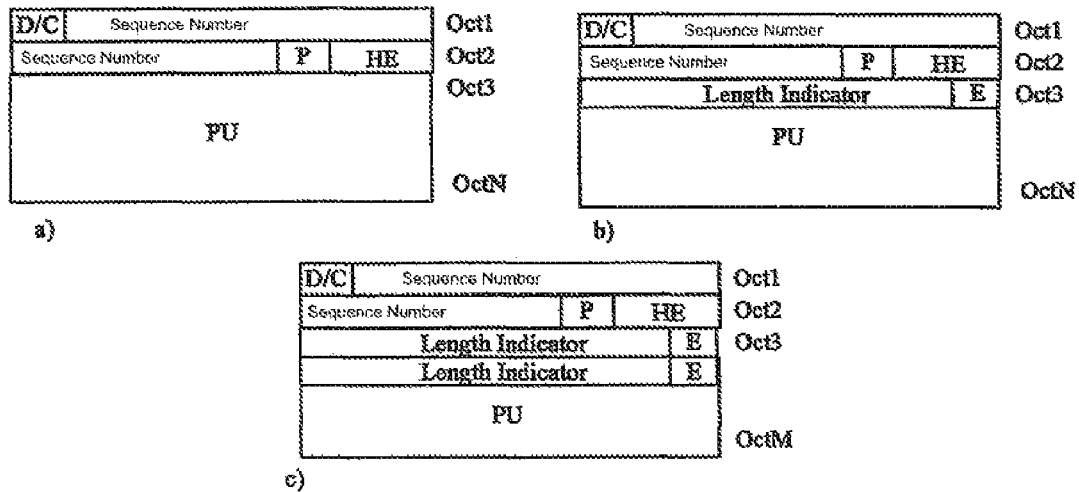
FIGS. 4A through 4C show different packet data units as is known in the prior art.
Figure 5:
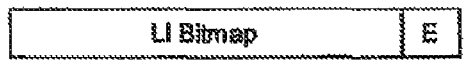
FIG. 5 is a simple representation of a length indicator bitmap contained in a packet data unit.
Figure 6:
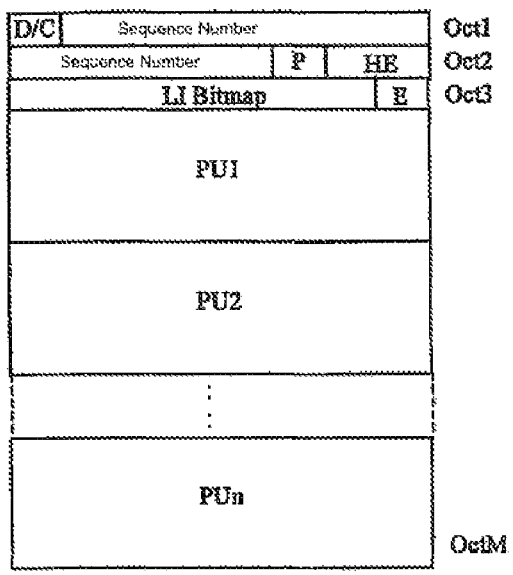
FIG. 6 is a schematic representation of the multiple payload units segmented from a service data unit.

It is assumed for the first exemplary embodiment that the AM RLC unit communicated to the MAC that four PUs are to be transmitted for the first time and that PUs are not to be repeatedly transmitted. It is also assumed that the MAC decides to simultaneously get rid of the four PUs. If the MAC wishes to transmit four PUs of 30 bytes each, it can select between the combination 4 and the combination 5. Combination 4 corresponds to a combination as it can also be used in the 99 version. Each PDU has exactly one PU. Ideally, the PDU size is selected such that the PDU can contain the PU and the sequence number, as well as the header extension HE and the polling bit P and D/C field (see FIG. 4a). The PU size is 30 bytes; sequence number, HE, P and D/C field require 2 bytes in total, so that the PDU size is ideally 32 bytes. Therefore, 128 bytes must be transmitted in order to transmit all four PUs.

Combination 5 uses the advantages of the present invention. All four PUs are contained in the one PDU. The size ideally derives from the dataset (=4PUs=120 bytes) and three additional bytes which are occupied by the sequence number, HE, P and D/C field and additionally by the LI bitmap (see FIG. 4). In total, 123 bytes must be transmitted. The network always prescribes the combinations (PDUs and PDU size).

It is assumed for this first exemplary embodiment that the MAC requests data in the fourth combination. The RLC AM unit forms four PUs, PDU1 to PDU4, from the four PUs (see FIG. 7). Each PDU contains the sequence number of the PU, the sequence number=10 is assumed for the PDU1 in this example and the sequence number=11 for the PDU2, etc. The D/C field is set to one since the data represent user data. The P field can be set to one when the receiving AM RLC unit is to acknowledge the reception of the already transmitted PUs. Given the PUs 1 to 3, the HE field is set to zero since useful data follow after the HE field. Given the PDU4, the HE field is followed by length indicators, so that the HE field is set to one.

Subsequently, MAC forwards the four PDUs to the layer 1 and the data is finally transmitted via the air interface. On the receiver side, the layer 1 forwards the data to the MAC which forwards the four PDUs again to the AM RLC unit. The order of the PUs can be recognized on the basis of the sequence number. On the basis of the HE field of each PDU, the AM RLC unit recognizes whether the HE field is followed by user data or length indicators. In the RLC PDUs 1 to 3, the HE field indicates that a LI bitmap or LI field does not follow. On the basis thereof, the receiving AM RLC unit additionally recognizes that an LI bitmap is not contained, so that only 1 PU fits into the PDU. The AM RLC unit knows the PU size and removes a correspondingly sized segment after the first two bytes of the PDU, whereby the bytes correspond to the PUs.

The HE field is set to one in the RLC PDU4. The AM RLC unit analyzes LI1 and thus receives the information that the SDU1 ends after the first 10 bytes after the LIs. The first extension bit is set to one, so that the AM RLC unit recognizes that a further LI follows. This second LI informs the AM RLC unit that the remainder of the PU can be ignored since it is filled with PU padding. The following extension bit E2 is set to zero, so that the AM RLC unit knows that the user data now follow. The AM RLC unit subsequently adds the missing 10 bytes of user data to the other three PUs, so that the original SDU1 results again and is forwarded via the radio bearer 3 to the higher layers.

It is assumed in the second exemplary embodiment that the MAC has selected the fifth combination. If the MAC selects this combination, the AM RLC unit forms one single PDU of the size of 123 bytes (see FIG. 8). The first two bytes contain the sequence number whose value is allocated to the first PU (sequence number=10), the D/C field with the allocated value 1 since the PDU is a data packet, the P field and the HE field which is inventively set to the value 2, for example, which means that the following byte contains a LI bitmap. Therefore, the third byte contains the LI bitmap. The last bit of the third byte contains the extension bit which indicates whether a further LI bitmap or the first PU follows which, in this case is set to zero, for example, in order to indicate that a further LI bitmap does not follow.

Each bit of the seven bit long LI bitmap indicates whether the corresponding PU starts with an LI or only contains user data. In this exemplary embodiment, the bit all the way to the right is allocated to the first PU that is inserted into the PDU and the bit all the way to the left is allocated to the PU inserted at the seventh location. In this exemplary embodiment, the four PUs 1 to 4 are inserted into the PDU, so that the first four bits from the right of the LI bitmap are used. PU4 is the only one of the four PUs starting with an LI. Therefore, the fourth bit of the LI bitmap from the right is set to 1.

Subsequently, RLC forwards the PDU to the MAC and the PDU is finally transmitted via the air interface. There, the layer 1 forwards the data to the MAC which subsequently forwards the PDU to said AM RLC unit and also informs said AM RLC unit about the size of the PDU. On the basis of the sequence number, the AM RLC unit knows which sequence number must be allocated to the first PU. All further PUs receive sequence numbers in the order they are contained in the PDU, whereby the sequence numbers respectively increase by one. On the basis of the HE field, the AM RLC unit recognizes that the third byte contains an LI bitmap. On the basis of the extension bit E1 of the third byte, the AM RLC unit recognizes that no further LI bitmap follows but the first PU. The AM RLC unit knows the PU size and thus can determine the maximum number of PUs contained in the PDU with the aid of the PDU size and the knowledge that three bytes were used for the control data (sequence number, D/C, P field, HE field and LI bitmap and extension bit):

Number of PUs=(PDU size−control data)/PU size

On the basis of the LI bitmap, the AM RLC unit determines which of the PUs start with an LI. In this exemplary embodiment, the fourth bit from the right is set to one. The AM RLC unit removes the PUs from the PDU and combines the first three PUs since these contain only user data. The first byte of the fourth PU communicates to the AM RLC unit that the SDU1 ends after the first ten bytes after the LIs. The extension bit E1 communicates to the AM RLC unit that another LI follows. This LI2 indicates that the remainder of the PU is to be ignored. The corresponding extension bit E2 indicates that user data follow. The AM RLC unit takes the following ten bytes, adds them to the PUs 1 to 3, so that the original SDU1 results. The AM RLC unit subsequently forwards the SDU1 to the higher layers.

In the following third exemplary embodiment, it is assumed that the first transmission of a PDU failed. A sequence number having the value five is allocated to the PU. As has already been mentioned, the PUs remain stored in the AM RLC unit until a positive reception acknowledgment is received. It is also assumed that the repeated transmission of this PDU has been requested by the receiving AM RLC unit. As has already been mentioned, the SDU1 has been segmented into the PUs 1 to 4, whereby the sequence numbers 10 to 13 have been allocated to them. The MAC received the information from the AM RLC unit that four PUs must be transmitted for the first time and that one PU must be transmitted again. It is also assumed that the MAC wishes to transmit four PUs. The MAC now ideally selects a combination for the data transmission which makes it possible to transmit the PUs, which are to be repeatedly transmitted, alone in a PDU. This is expedient since the PUs to be repeatedly transmitted normally are not in the same order with the other PUs to be transmitted. If these PUs are transmitted in a PDU, additional control data extensions must be added to the PDU.

In this example, the MAC would receive the information from the AM RLC unit that a PU is to be transmitted again. Subsequently, the MAC would ideally select the fourth combination since it wishes to transmit four PUs, whereby one of them must be repeatedly transmitted. Therefore, the PUs 0 to 3 are packed into four PUs 1 to 4. PDU1 carries PU0 and the value of the sequence number is set to 5. The PDUs 2 to 4 contain the PUs 1 to 3 and the sequence numbers are set to the values 10 to 12. Given the next request, the MAC transmits the PU4. The PDUs are forwarded to the MAC and are finally transmitted via the air interface. On the receiver side, the AM RLC unit evaluates the control data and recognizes on the basis of the control data that the PUs are not in the correct order. On the receiver side, the control data are evaluated as described in the first example. If it is assumed that the PU0 was the last missing segment of an SDU0, this SDU0 is assembled and forwarded to the higher layers. The SDU1 is not assembled and forwarded to the higher layers until the PU4 has been transmitted. In total, 128 bytes are required for the transmission of the PUs 0 to 3.

It is assumed in the following fourth exemplary embodiment that the MAC received the information from the AM RLC unit that four 4 PUs must be transmitted for the first time and that one PU is to be repeatedly transmitted. It is assumed that the MAC wishes to transmit four PUs and selects a combination for this purpose wherein a number of PUs, which are not in the correct order, are transmitted in a PDU. This means for this example that the MAC selects the combination 5.

Figures 8, 9:
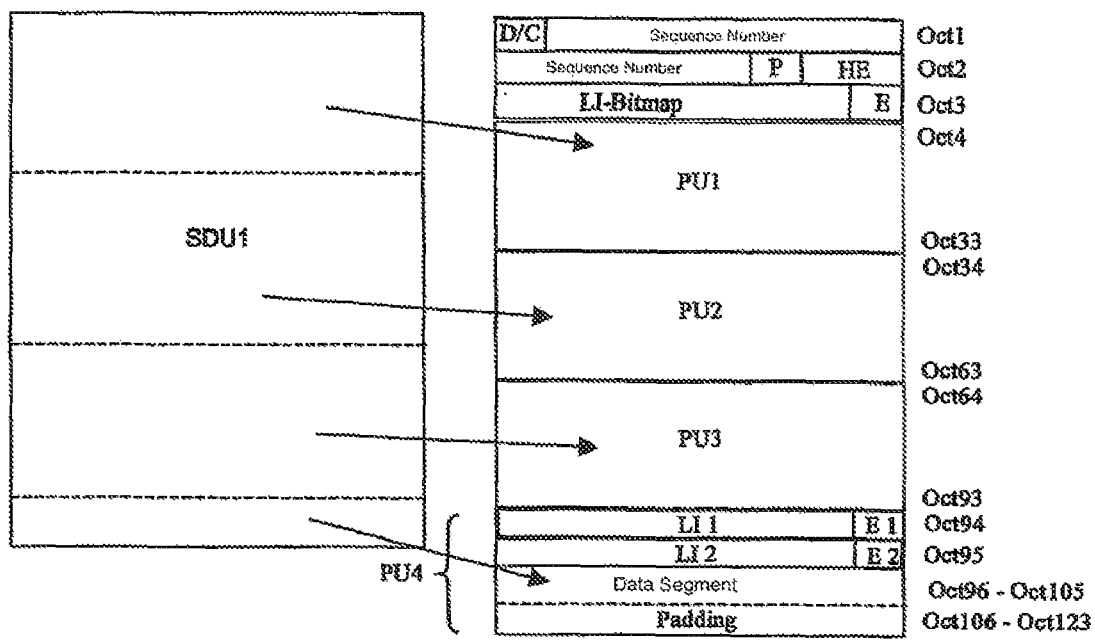
FIG. 8 shows an alternative embodiment of the present invention.
FIG. 9 shows a simple block diagram representation of a control data extension which may be added to a packet data unit.
Figure 10:
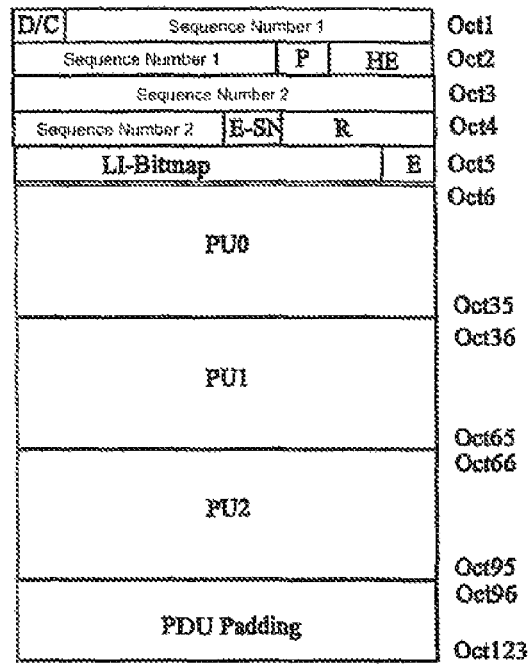
FIG. 10 shows a block diagram representation of a packet data unit that is ready for forwarding to a respective medium access control.

Since the sequence number of the PU0 I is not in the correct order relative to the PUs 1 to 4, a control data extension must be added to the PDU (FIG. 9). FIG. 10 shows the PDU that is forwarded to the MAC. The sequence number 1 of the PDU contains the value 10 since the first PU is in the correct order PU1 which has the sequence number 10 allocated. D/C and P field are set as described above. A value is allocated to the HE field which indicates that a control data extension containing the sequence number 2 of the PU0 follows. In this example, this value is 2. The control data extension (see FIG. 10) is composed of a field containing the sequence number 2, of an extension bit SN E (sequence number extension=sequence number extension bit) indicating whether another control data extension or the LI bitmap follows, and of a field that can be used for future extensions. In this case, the value 5 is allocated to the sequence number 2; namely, the sequence number of the PU0. In this example, the SN-E bit indicates that the control data extension is followed by the LI bitmap. For this purpose, the value 0, for example, is allocated to the SN-E bit. Therefore, five bytes are occupied of the PDU having the original size of 123 bytes. As a result, only three PUs of the size of 30 bytes fit into the PDU. When the PUs are inserted into the PDU, a rule that is also known to the receiver side is applied, so that the receiver side can allocate the sequence numbers of the control data extension to the PUs to be repeatedly transmitted. In this example, the PUs to be repeatedly transmitted, here the PU0, are inserted first into the PDUs. Subsequently, the PUs 1 and 2 follow. The remainder of the PDU is occupied with padding. Then, the PDU is forwarded to the MAC and is finally transmitted via the air interface. On the receiver side, the PDU is handed to the top through the layers where it finally arrives at the AM RLC unit. The AM RLC unit receives the information from the first sequence number that the number 10 must be allocated to the first PU in the correct order. On the basis of the HE field, the AM RLC unit recognizes that a control data extension follows. On the basis of the control data extension, it receives the information from the sequence number 2 that the sequence number 5 is allocated to the first PU to be repeatedly transmitted. Due to the rule which determines where the PU can be found within the PDU, the AM RLC unit knows which PU needs the sequence number allocated. In this example, the PUs to be repeatedly transmitted are inserted first into the PDU. Therefore, the sequence number 2 is allocated to the PDU. Besides, the AM RLC unit receives the information from the E-SN field that the control data extension is followed by the LI bitmap. The AM RLC unit derives from the LI bitmap which of the PUs, namely all PUs contained in the PDU, starts with the LI field. As it has already been mentioned above, the MAC informs the AM RLC unit about the PDU size given the transfer of the PDU. The AM RLC unit can determine the size of these control data due to the above-described evaluation of the control data. In this case, the size of the control data is five bytes. On the basis of the size of the PDU minus the control data, the AM RLC unit can determine the number of the PUs that can be contained in the PDU at a maximum:

Number of PUs=(PDU size−control data size)/PU size

Figure 11:
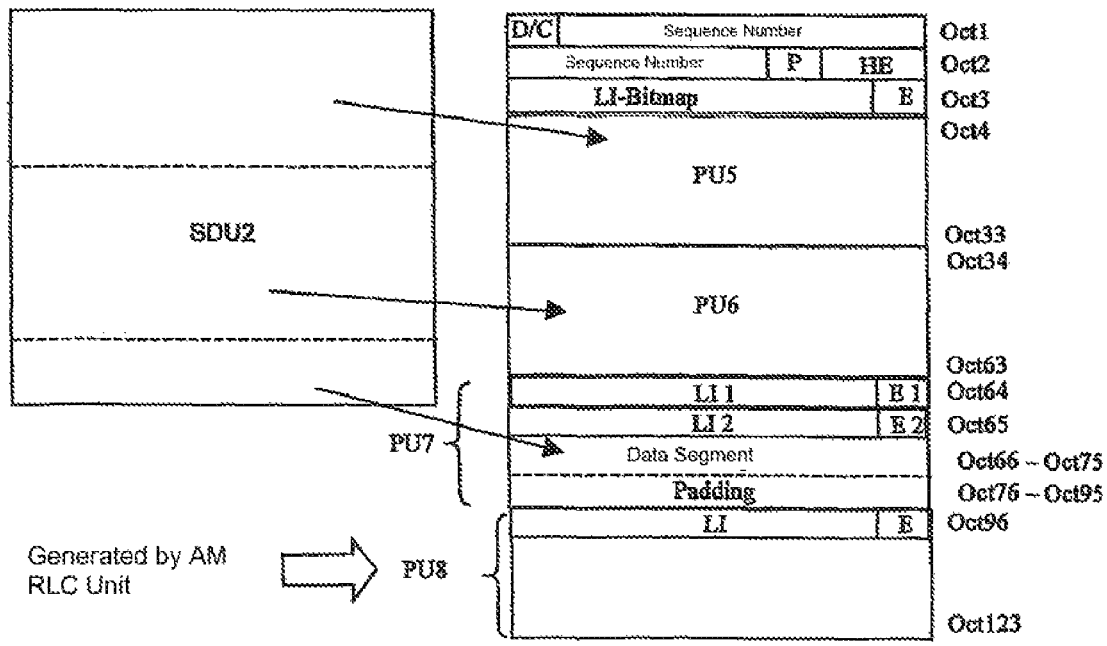
FIG. 11 shows another alternative embodiment of the present invention.

In this example, the AM RLC unit thus knows that three PUs are contained at a maximum and that the remainder of the PDU has been filled with PUD padding. Therefore, the AM RLC unit can correctly unpack the PDU. It is assumed in the fifth exemplary embodiment (FIG. 11) that an SDU2 has the size of 80 bytes. Therefore, the SDU is segmented into three PUs, PU5 to PU7, whereby PU5 and PU7 only contain user data, so that LI fields are not inserted. PU7 starts with a first LI1 which indicates that 20 bytes of user data follow after the LIs and that the SDU then ends. The extension bit E1 indicates that a further LI follows. This second LI2 indicates that the remainder of the PU has been filled with padding. It is also assumed that the sequence numbers 20 to 22 are allocated to the PUs. Furthermore, it is assumed that the MAC has decided to transmit four PUs in the fifth combination although only the three PUs PU5 to PU7 are available in the AM RLC unit for the transmission. Subsequently, the AM RLC unit generates a PU8 which starts with an LI that indicates that the remainder of the PU has been filled with PU padding. The extension bit indicates that the LI is not followed by another LI. The AM RLC does not allocate a sequence number to the PU8.

Given the generation of the PDU, the value 20 is allocated to the sequence number of the PDU. The HE field indicates that the LI bitmap follows in the next byte in that the value 2, for example, is allocated to it. The bits of the LI bitmap are set such that they indicate that the PUs 7 and 8 start with a LI field. It is assumed for this example that the PU, which is inserted first into the PDU, is associated with the right bit of the LI bitmap and that the PU, which is inserted at the seventh location, is associated with the left outer bit. It is also assumed for this example that a bit, which is set to one, indicates that the corresponding PU starts with an LI field. In this example, the third and fourth bit of the LI bitmap from the right, therefore, must be set to one and all other bits to zero. The extension bit E following the LI bitmap indicates that a further LI bitmap does not follow. Subsequently, the PUs 5 to 8 are inserted into the PDU and the PDU is forwarded to MAC and is finally transmitted via the air interface. In the receiver, the PDU is handed to the top through the layers until MAC, together with the information about the size of the PDU, forwards the PDU to the AM RLC unit. The AM RLC unit derives from the sequence number that the first PU is allocated to the sequence number 20 in the correct order. The AM RLC unit recognizes from the HE field that the LI bitmap follows in the next byte. The E-bit following the LI bitmap indicates that a further LI bitmap does not follow. In total, three bytes are occupied by control data. The AM RLC unit received the information from MAC that the PDU has a size of 123 bytes. Therefore, 120 bytes remain for the PUs. Since the AM RLC unit also knows the size of the PUs, 30 bytes in this example, it knows that four PUs at a maximum are contained in the PDU. The AM RLC unit subsequently examines the LI bitmap and derives therefrom which PUs start with a LI field. In this case, the AM RLC unit recognizes that the PUs PU7 and PU8 start with a LI field since the third and fourth bit of the LI bitmap from the right were set to the value 1. The AM RLC unit removes the PUs PU5 and PU6 from the PDU and allocates the sequence numbers 20 and 21 to them. The AM RLC unit allocates the sequence number 22 to the PU7. The AM RLC unit derives from the first LI of the PU7 that the first ten bytes after the LIs represent the last ten bytes of a SDU.

On the basis of the E-bit E1, the AM RLC unit knows that another LI follows. This second LI2 indicates that the remainder of the PU has been filled with PU padding. Subsequently, the AM RLC unit removes the last ten bytes of the SDU2 from the PU and adds these to the PUs 5 and 6, so that the original SDU2 results again and can be forwarded to the higher layers. The RLC unit derives from the LI of the PU8 that the remainder of the PU has been filled with padding, so that user data are not contained. As a result, this PU is ignored or deleted and a sequence number is not allocated to it.

Although the present invention has been described with reference to specific embodiments, those of skill in the art will recognize that changes may be made thereto without departing from the spirit and scope of the present invention as set forth in the hereafter appended claims.

The invention claimed is:

1. A method for exchanging data packets between two service providers of a radio transmission system, the method comprising:
retrieving, via a first service provider, a first data packet at a first service access point;
dividing, via the first service provider, the first data packet into a first set of data segments;
generating, via the first service provider, a packet data unit from a first data segment of the first set of data segments and a second data segment from the first set of data segments, wherein:
the packet data unit has a first control data field including a bitmap,
the first bit of the bitmap indicating whether the first data segment contains a first data segment control data field including a first length indicator, and
the second bit of the bitmap indicating whether the second data segment contains a second data segment control data field including a second length indicator; and
transferring, via the first service provider, the packet data unit, via a second service access point, to a second service provider.

2. A method for exchanging data packets between two service providers of a radio transmission system as claimed in claim 1, wherein the first packet data unit contains at least a third data segment from a second data packet, with the first control data field indicating which of the first, second, or third data segments contained in the packet data unit has at a data segment control data field.

3. A method for exchanging data packets between two service providers of a radio transmission system as claimed in claim 1, wherein a particular length indicator in a particular data segment indicates a location where the respective data packet ends within the particular data segment.

4. A method for exchanging data packets between two service providers of a radio transmission system as claimed in claim 3, wherein the particular length indicator is followed by a further control data field which indicates whether filler data follow after the location prescribed by the length indicator.

5. A method for exchanging data packets between two service providers of a radio transmission system as claimed in claim 1, the method further comprising the step of allocating sequence numbers to the data segments of a data packet, wherein the sequence numbers of adjacent data segments respectively differ by a prescribed unit.

6. A method for exchanging data packets between two service providers of a radio transmission system as claimed in claim 5, wherein the packet data unit has a first sequence number field which represents a number corresponding to the sequence number of the first data segment that occurs first in the packet data unit.

7. A method for exchanging data packets between two service providers of a radio transmission system as claimed in claim 1, wherein the packet data unit contains first data segments to be transmitted for a first time to the second service provider and contains repeatedly requested second data segments of a second data packet, and a control data extension is followed by the first control data field and contains at least a second sequence number field and an indicator field, and wherein the second sequence number field represents a number corresponding to the sequence number of the second data segment that occurs first in the packet data unit and has to be transmitted again and the indicator field indicates whether the control data extension is followed by one of the first control data field and user data.

8. A method for exchanging data packets between two service providers of a radio transmission system as claimed in claim 7, wherein the first and second data segments are combined into a group and follow one another within the group according to a respective sequence number.

9. A method for exchanging data packets between two service providers of a radio transmission system as claimed in claim 1, wherein the control data field is followed by at least one further control data field.

10. A method for exchanging data packets between two service providers of a radio transmission system as claimed in claim 7, wherein the first service provider informs the second service provider about the number of first and second data segments to be transmitted, and the second service provider subsequently prescribes an optimal combination of the number and size of the packet data units to be transmitted.

* * * * *